Nov. 12, 1935.  W. E. PORTER  2,020,739
CENTRIFUGAL FRICTION GOVERNOR FOR CLOCK TRAINS, ETC
Filed Aug. 18, 1933
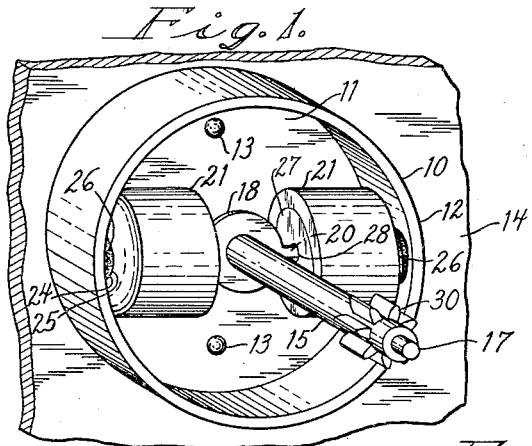
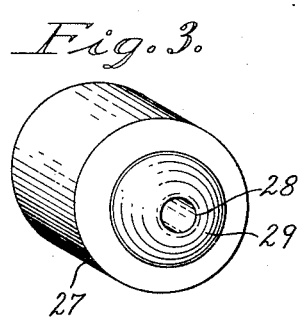
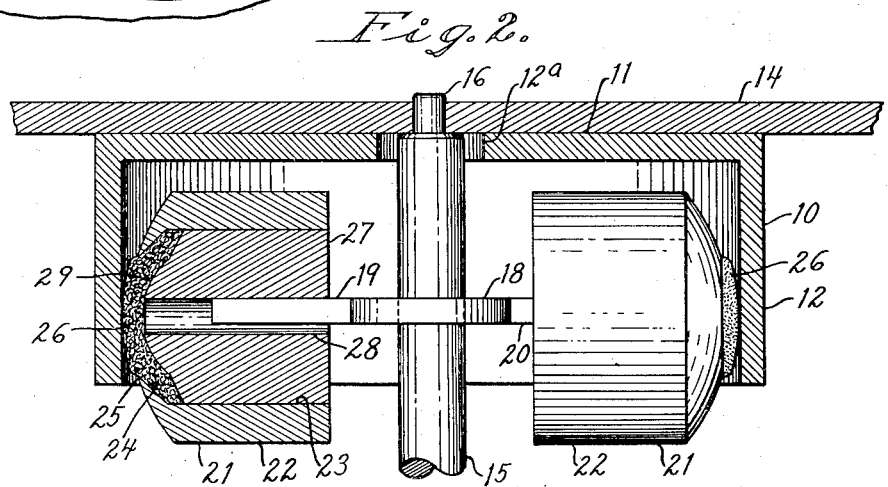
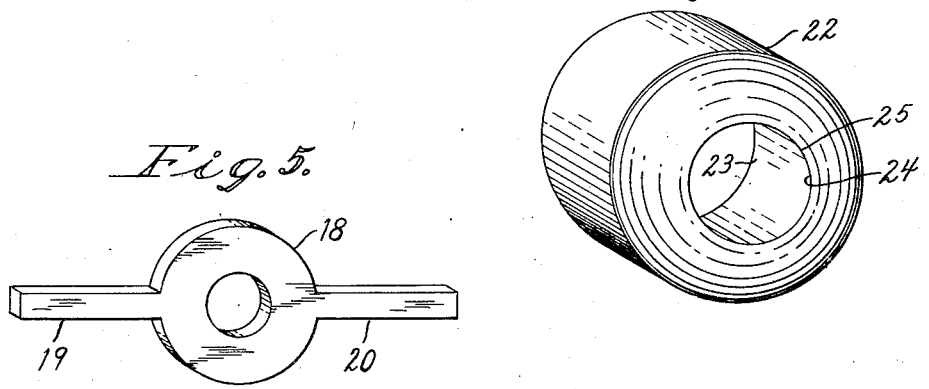

Patented Nov. 12, 1935

2,020,739

UNITED STATES PATENT OFFICE 2,020,739

CENTRIFUGAL FRICTION GOVERNOR FOR CLOCK-TRAINS, ETC.

Wilson E. Porter, New Haven, Conn., assignor to The New Haven Clock Company, New Haven, Conn., a corporation Application August 18, 1933, Serial No. 685,746

2 Claims. (Cl. 188—185)

This invention relates to an improvement in frictional speed governors, primarily designed for limiting the speed of clock-trains such, for instance, as alarm-trains, strike-trains, chime-trains, etc., though not so limited.

One of the objects of the present invention is to provide an effective centrifugal friction governor which may be manufactured at such low cost as will enable it to be used in low-priced clocks and the like.

A further object is to provide a simple and reliable centrifugal friction governor which will operate effectively without dependency upon spring tension.

Another object is to provide a centrifugal friction governor having governing characteristics which are substantially uniform throughout the life of the device.

A still further object is to provide a governor of the class described which may be assembled for proper running with a minimum effort.

Other objects and advantages will appear to those skilled in the art from the following, considered in conjunction with the accompanying drawing and the appended claims.

In the accompanying drawing:

Fig. 1 is a perspective view of one form which a centrifugal friction governor may assume in accordance with the present invention;

Fig. 2 is a broken sectional view through the axis of the device, but on a larger scale;

Fig. 3 is a perspective view of one of the weight-plugs, detached;

Fig. 4 is a perspective view of the weight-shell, detached; and

Fig. 5 is a similar view of the supporting-member.

The particular embodiment of the present invention herein chosen for illustration includes a friction-cup 10 having a bottom-wall 11 and an annular flange 12, the said bottom-wall having a clearance-opening 12a and being secured in any approved manner such, for instance, as by rivets 13 to a mounting-plate 14. Extending within the friction-cup 10 and through the clearance-opening 12a therein, is a shaft 15 provided at its respective opposite ends with trunnions 16 and 17, the former of which bears for rotation in the mounting-plate 14, and the latter of which may be similarly supported in any approved manner.

Rigidly staked to the shaft 15, above referred to, is a supporting-member 18 preferably formed of sheet-metal and provided with two oppositely-extending radial supporting-arms 19 and 20, respectively radially offsetting in opposite directions.

Mounted on each of the arms 19 and 20 of the supporting-member 18 is a weight-member, generally designated by the reference character 21. Each of the said weight-members 21 comprises a shell 22 having an axial bore 23 of relatively-large diameter and contracted at its outer end by an inwardly-projecting annular retaining-lip 24 tapering down to a relatively-thin edge surrounding an opening 25 through which projects a friction-shoe 26 formed of felt, leather or other suitable friction material. Forced tightly into the bore 23 of the weight-shell 22 is a weight-plug 27 having an axial bore 28 and provided at its outer end with a deflecting-boss 29 which serves, when the weight-plug is in place within the weight-shell 22, to force the material of the friction-shoe outwardly beyond the surface of the outer end of the said weight-shell.

The supporting-arms 19 and 20 and the bores 28 of the respective weight-members are so proportioned that the respective weight-members may freely rotate and freely slide radially on the said arms with respect to the shaft 15.

The shaft 15 may be driven in any approved manner, but as herein shown for the purpose of illustration, the said shaft is provided with a pinion 30 which may be meshed into by any suitable driving-gear forming a feature, for instance, of a clock-train, the speed of which it is desired to govern.

When the shaft 15 is rotated, as before described, the supporting-member 18 secured thereto will similarly swing the weight-members 21 within the flange 12 of the friction-cup 10, with the effect of causing the friction-shoes 26 of the respective weights to engage the interior surface of the said flange. As the speed of the shaft 15 increases, the weight-members will be urged by centrifugal force into tighter and tighter friction engagement with the interior of the flange 12 to thus increase the amount of friction proportionately to the speeding.

The effective governing action of the governor may be varied by varying the weight of the weight-members 21.

As thus constructed and arranged, the governor is very economical to manufacture and assemble and does not depend for its functioning upon the tension of the delicate springs, etc., so that governors of the type herein shown and described may be produced by mass production methods, and each may be relied upon to have a corresponding governing action requiring no delicate adjustment.

The invention may be carried out in other specific ways than that herein set forth without departing from the spirit and essential characteristics of the invention, and the present embodiment is therefore to be considered in all respects as illustrative and not restrictive, and all changes coming within the meaning and equivalency range of the appended claims are intended to be embraced therein.

I claim:

1. A centrifugal friction governor comprising a ring-like friction-member; a rotary shaft extending axially within the said friction-member; a supporting-member staked to the said shaft and provided with a pair of complementary laterally-offsetting supporting-arms; and a friction-weight mounted upon each of the said supporting-arms and provided with a longitudinal bore freely receiving the said supporting-arms of the said supporting-member and slidable and freely rotatable thereon free of spring restraint into frictional contact with the said friction-member.

2. A centrifugal friction governor comprising a ring-like friction-member; a rotary member extending axially within the said friction-member and provided with one or more laterally-offsetting supporting-arms; and a friction-weight carried by each of the said supporting-arms and comprising a shell-member, a friction-shoe projecting through the outer end of the said shell-member and a plug-member fitting within the said shell-member and engaging the said friction-shoe to project the same beyond the surface of the said shell-member, the said plug-member being provided with an axial bore freely receiving the said supporting-arm.

WILSON E. PORTER.